(12) United States Patent
Vyavahare et al.

(10) Patent No.: US 11,641,304 B2
(45) Date of Patent: May 2, 2023

(54) METHOD FOR MANAGING A PLURALITY OF EVENTS

(71) Applicant: GUAVUS Inc., San Jose, CA (US)

(72) Inventors: Prasad Vyavahare, San Jose, CA (US);
Swati Choksi, San Jose, CA (US);
Silvia Veronese, San Jose, CA (US);
Roger Brooks, San Jose, CA (US);
Zainab Jamal, San Jose, CA (US)

(73) Assignee: GUAVUS INC., San Jose, CA (US)

( * ) Notice: Subject to any disclaimer, the term of this patent is extended or adjusted under 35 U.S.C. 154(b) by 139 days.

(21) Appl. No.: 16/942,038

(22) Filed: Jul. 29, 2020

(65) Prior Publication Data
US 2022/0038331 A1    Feb. 3, 2022

(51) Int. Cl.
| | |
|---|---|
| H04L 41/0604 | (2022.01) |
| G06N 20/00 | (2019.01) |
| G06N 5/04 | (2006.01) |
| H04L 41/0631 | (2022.01) |
| G06F 16/22 | (2019.01) |
| G06F 16/23 | (2019.01) |
| G06F 16/901 | (2019.01) |

(52) U.S. Cl.
CPC ........... *H04L 41/0609* (2013.01); *G06N 5/04* (2013.01); *G06N 20/00* (2019.01); *H04L 41/065* (2013.01); *G06F 16/2228* (2019.01); *G06F 16/2237* (2019.01); *G06F 16/2365* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2013/0097125 A1* | 4/2013 | Marvasti | G06F 16/90 707/E17.002 |
| 2019/0325314 A1* | 10/2019 | Bourges-Sevenier | G06N 3/063 |
| 2021/0117857 A1* | 4/2021 | Sriharsha | G06F 16/285 |

* cited by examiner

*Primary Examiner* — William G Trost, IV
*Assistant Examiner* — Christopher P Cadorna
(74) *Attorney, Agent, or Firm* — Adam F. LEWENTAL—THALES DIS GPL USA, Inc

(57) ABSTRACT

The invention provides a method for managing a plurality of events, wherein each event comprises physical attributes and logical attributes by creating tuples with the events with the same logical attributes, providing a set of hierarchized relations between tuples, by means of a pipeline algorithm, wherein parent-child relations are provided between tuples, classifying the tuples in families, each family contains all the tuples related according to the parent-child relation provided by the pipeline algorithm, identify the parent tuple of each family, defined as the tuple which has at least one children and has no parent and present the parent tuples, together with the physical attributes of the events associated to each parent tuple.

14 Claims, 2 Drawing Sheets

|  | tuple1 | tuple2 | tuple3 | tuple4 | tuple5 | tuplen |
|---|---|---|---|---|---|---|
| T_bin = 0, 1 | 0 | 1 | 1 | 0 | 0 | 1 |
| T_bin = 1, 2 | 1 | 0 | 0 | 1 | 1 | 0 |
| T_bin = 2, 3 | 1 | 1 | 0 | 0 | 0 | 0 |
| T_bin = n-1, n | 1 | 1 | 1 | 1 | 1 | 1 |

METHOD FOR MANAGING A PLURALITY OF EVENTS

TECHNICAL FIELD

This invention belongs to the field of Network Operations Control (NOC) and their events management.

STATE OF THE ART

Network Operations Control teams are usually flooded with thousands of network events at any given time. Depending on the network size, this amount may be in the order of hundreds of thousand a day, which is an overwhelming volume.

At this rate, manual analysis and prioritization of events becomes an extensive and time-consuming task. There are existing solutions to manage events and classify them according to their severity, but even in those cases, approximately 10-20% of events are listed as critical, which provides an amount of events which is still far from appropriate.

It is therefore a problem to choose which ones should be ignored and which ones need the NOC attention.

Since networks are made up of interconnected components, problems in one component have the potential to propagate to other parts of the network. The more time it takes to identify and fix the problems in the network, the greater the impact.

Manually crafted rules may be useful in some cases, but they depend on the network topology. If it changes, former rules need to be updated or replaced.

It is therefore important to have an automated method which does not depend on the network topology or on specific network configurations that may vary over time.

DESCRIPTION OF THE INVENTION

The invention provides a solution for this problem by means of a method according to claim 1, and a system according to claim 12. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for managing a plurality of events, wherein each event comprises physical attributes and logical attributes, the method comprising the steps of
  creating tuples, wherein each tuple comprises all the events with the same logical attributes;
  providing a set of hierarchized relations between tuples, by means of a pipeline algorithm, wherein parent-child relations are provided between tuples;
  classifying the tuples in families, each family contains all the tuples related according to the parent-child relation provided by the pipeline algorithm;
  identifying the parent tuple of each family, defined as the tuple which has at least one children and has no parent, and
  presenting the parent tuples, together with the physical attributes of the events associated to each parent tuple.

This invention solves the aforementioned technical problems by performing a reduction of event instances by grouping them in families. These events are grouped by finding the hidden dependency structure and relationships between them.

The events comprise certain attributes which provide logical information of that event. For example, in the event of an event instance, those logical attributes would be "event type", "event origin", "event cause" or "event problem" etc. On the other hand, physical attributes would correspond to the network topology, device attributes, etc.

Events are grouped in tuples, in such a way that each tuple is defined by a group of logical attributes: all the events with the same logical attributes constitute a tuple. Hence, the number of tuples in a dataset represent a unique set of logical information of the events in that dataset.

The input set of tuples is fed to the automated machine learning pipeline algorithm which classifies those tuples in families in parent-child relationship format.

Tuples connected hierarchically within a family share a relationship provided by the pipeline algorithm. The parent tuples in each of the families are called "root issue" and are presented at the end of the method as the most important events to deal with.

This significantly reduces the amount of crucial events, and provides the NOC with a set of events which is far easier to handle than the original dataset.

Further, there is an additional advantage concerning this method. This method comprises an unsupervised pipeline algorithm which does not rely on the topological attributes of the network, since only the logical attributes are used to create the tuples. This means when the network topology is changed or some elements in network are added or removed, the pipeline algorithm, by its own nature, is able to adapt to the updated topology without having the topological information.

In some particular embodiments, the step of providing the set of hierarchized relations is carried out by an unsupervised machine learning algorithm comprising the steps of
  creating a co-occurrence matrix, wherein each column corresponds with a tuple and each row corresponds with a time interval, so each matrix entry represents the number of times that each tuple appears in each time interval;
  successively applying a heuristic function to each matrix entry to obtain a co-occurrence probabilistic score for each pair of tuples
  creating a first attempt of parent-child relations; and
  using the probabilistic score of each pair of tuples to quantify the strength of the first attempt of parent-child relations.

The co-occurrence matrix aims to show the time distribution of the different tuples. For example, a co-occurrence matrix divides the time each 10 seconds, so the first row will show the events received from 0 seconds to 10 seconds, then the second row will show the events received from 10 seconds to 20 seconds, and so on. Since the co-occurrence matrix is based on time interval, the heuristic function aims to relate the succession of tuples in terms of time interval.

In some particular embodiments, the unsupervised machine learning algorithm further comprises the step of
  firstly dividing the data into two samples so that the steps of creating the co-occurrence matrix, apply the heuristic function and create a first attempt of parent-child relations are carried out for each of the two samples;

after these steps, identifying the parent-child relations of the first attempt which are identical in the two samples; and use the parent-child relations which are identical in the two samples to provide the final set of parent-child relations between tuples, which are used in the remainder steps of the method.

Basically, the input data (i.e., the events dataset) is divided into two samples. For example, an input data of 4 million events is divided into 2 samples of 2 million of events each. Depending on sampling technique, the data split between samples may not be symmetrical. Then, additional steps are performed for each of the samples, e.g., stable portions from both the samples are extracted and used as an input for the next steps.

A stable portion of a sample is defined as subset of data that contains all the information required for the pipeline algorithm to execute and wherein the remainder of the samples provides with no new additional information.

In particular embodiments, the creation of parent-children relations fulfill the following requirements:
the root issue must happen for any child issue to occur;
a child may in turn have more children;
the length of a time window corresponds to the propagation time of failure throughout the subsystem as represented in observed data; and
a relation parent-child will be considered as strong if it overcomes a predetermined quantitative threshold.

The root issue must happen for any child issue to occur. In some time windows, there is only the child event occurring, but the method of the invention analyzes all the time windows and creates parent-child relationship based on the co-occurrence of these events in multiple time windows.

A parent-child relationship is quantized and categorized by comparing with a quantitative threshold for optimal window selection.

In particular embodiments, prior to the step of dividing the data into two samples, the method comprises the step of cleaning the tuples, by deleting those tuples which do not fulfill a plurality of minimum requirements.

These requirements may be related to sparsity, redundancy, null events or any other requirement imposed by the user.

In particular embodiments, the step of creating a first attempt of parent-child relations comprises
creating a graph of parent-child relations based on the results of the heuristic function
calculating a probability for each parent-child relation and mark those parent-child relations which has a probability higher than a predetermined threshold as strong.

In some particular embodiments, the step of creating the co-occurrence matrix comprises creating a plurality of co-occurrence matrixes for each sample, wherein each co-occurrence matrix is created for a different time interval.

In these particular cases, instead of a single co-occurrence matrix, a plurality of co-occurrence matrixes are created for different time intervals for each stable sample. Each co-occurrence matrix has a different time division, so there is, for example, a first co-occurrence matrix which divides the time each 1 second, a second co-occurrence matrix which considers a 2 second time interval, and so on. In most cases, there are about 20 or 30 different co-occurrence matrixes for each stable sample, all of them having time intervals between 1 and 20-30 seconds. However, in other embodiments, time intervals may group granularity at seconds, minutes or hourly level.

In some particular embodiments, the method further comprises the step of choosing an optimal co-occurrence matrix, and use the parent-child relations generated by the optimal co-occurrence matrix to provide the final set of parent-child relations between tuples.

According to the steps of this method according to the invention, a set of parent-child relations is obtained for each co-occurrence matrix. Based on highest quality of the families set, the optimal co-occurrence matrix is chosen.

Identifying common tuples in both samples provide stronger results. Based on some validation tests, these common tuples cover more than 90% on the input data. Rest of the tuples are considered as less likely or as weak relationship tuples.

In some particular embodiments, the step of presenting the parent tuples comprises presenting the instances associated to each parent tuple.

Whether an instance is associated with an issue is analyzed in validation phase where we map how many families are associated with issues etc.

In some particular embodiments, the step of presenting the parent tuples comprises conferring a severity index to each parent tuple of each family, so that the final list of parent tuples is hierarchized.

The severity index is related, among others, with the number of tuples of the family. This severity classification can be done if a severity index is available in the original dataset of events.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figures 1, 2:
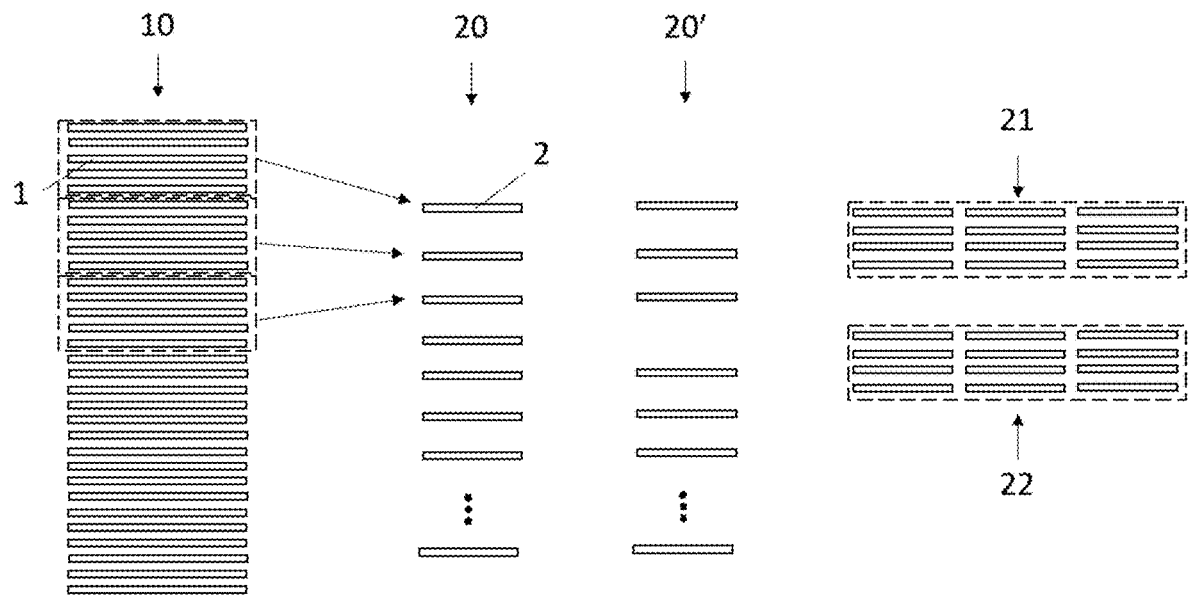
FIG. 1 shows a first step of a method according to the invention, which is the creation of tuples.
FIG. 2 shows further steps of this method, which includes the creation of a plurality of co-occurrence matrixes.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The invention provides a method for managing a plurality of events, wherein each event comprises physical attributes and logical attributes. This method comprises several steps.

FIG. 1 shows a first step of a method according to the invention, which is the creation of tuples.

From the original event dataset, and based on the logical attributes of each event 1, tuples 2 are defined, in such a way that each tuple 2 comprises all the events 1 with the same logical attributes.

Hence, the original event dataset 10 has been converted into a tuples dataset 20. Each tuple is identified by a tupleID.

Afterwards, the tuples dataset 20 is cleaned, obtaining a clean tuples dataset 20' by deleting those tuples which do not fulfil a plurality of minimum requirements. These requirements may be related to sparsity, redundancy, null events or any other requirement imposed by the user.

The clean tuples dataset 20' is then divided into two stable data samples 21, 22. These two stable data samples have substantially the same number of tuples.

FIG. 2 shows further steps of this method. For each data sample, a plurality of co-occurrence matrixes are created.

For each co-occurrence matrix, time is divided into different time intervals. Hence, one co-occurrence matrix is, for example, created with time intervals of 1 second, then another co-occurrence matrix is created with time intervals of 2 seconds, and so on. For each co-occurrence matrix, each column correspond with a tuple and each row corresponds with a time window, so each matrix entry represents the number of times that each tuple appears in each time window.

For each stable sample, there is a plurality of co-occurrence matrixes, each one reflecting the time succession of the different tuples when time is divided according to different time intervals.

For the first stable sample, there will be, for example, 20 different co-occurrence matrixes, and there will be another 20 different co-occurrence matrixes for the second stable example.

For each of the co-occurrence matrixes of each of the stable samples, a heuristic function is applied to obtain a co-occurrence probabilistic score of each pair of tuples. This probabilistic score reflects the probability that one tuple of the pair occurs after the other tuple of the pair.

Figure 3:
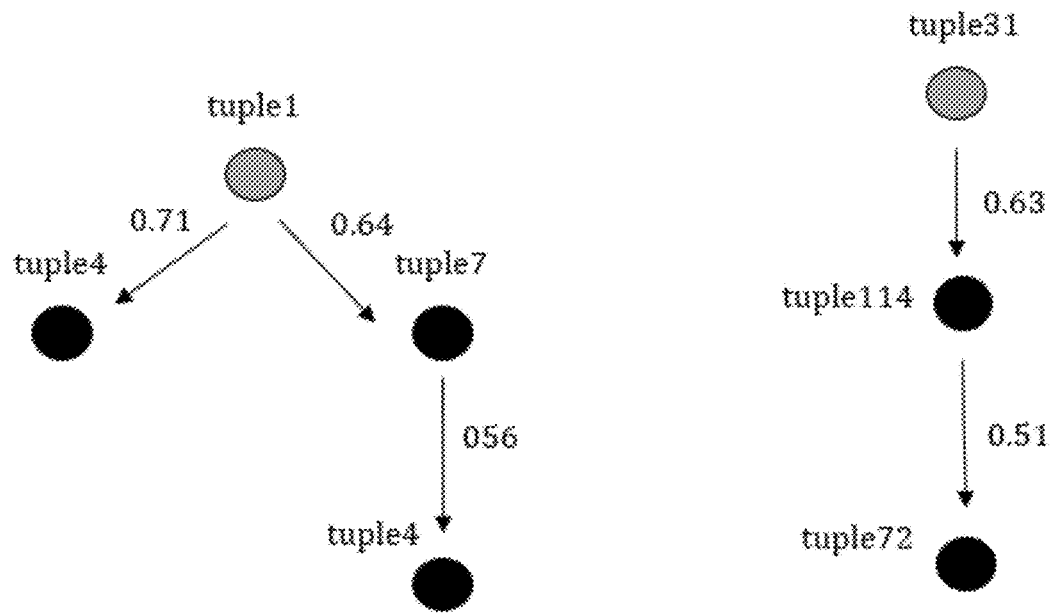
FIG. 3 shows a graph of a first attempt of parent-child relations as a result of some steps of a method according to the invention.

FIG. 3 shows a first attempt of parent-child relations as a result of this heuristic function, where pairs of tuples with a probabilistic score higher than 0.4 are shown according to their preliminary parent-child relation.

There will be one graph like the one of this figure for each one of the co-occurrence matrixes and for each one of the two samples.

Provided these results, an optimal co-occurrence matrix is chosen for each sample. The optimal co-occurrence matrix is that which provides parent-child relation with the better probabilistic scores. The parent-child relations provided by the optimal co-occurrence matrix are used to provide a set of hierarchized relations between tuples. The time interval of this optimal co-occurrence matrix is called optimal time window. For example, it may be that the co-occurrence matrix which was created using time intervals of 6 second is the optimal co-occurrence matrix, since it gives place to optimal parent-child relations. In this case, the optimal time window would be 6 seconds.

Hence, each stable sample gives place to a set of hierarchized relations between tuples. Each group of tuples related by the parent-child relations is called a tuples family. Hence, each stable sample gives place to a set of tuples families.

Then, the common parent-child relations which are identical in the two samples are identified and used to provide the final set of tuples families.

Once the final set of tuples families is achieved, the following steps of the method are carried out
- identify the parent tuple of each family, defined as the tuple which has at least one children and has no parent, and
- present the parent tuples, together with the physical attributes of the events associated to each parent tuple.

Figure 4:
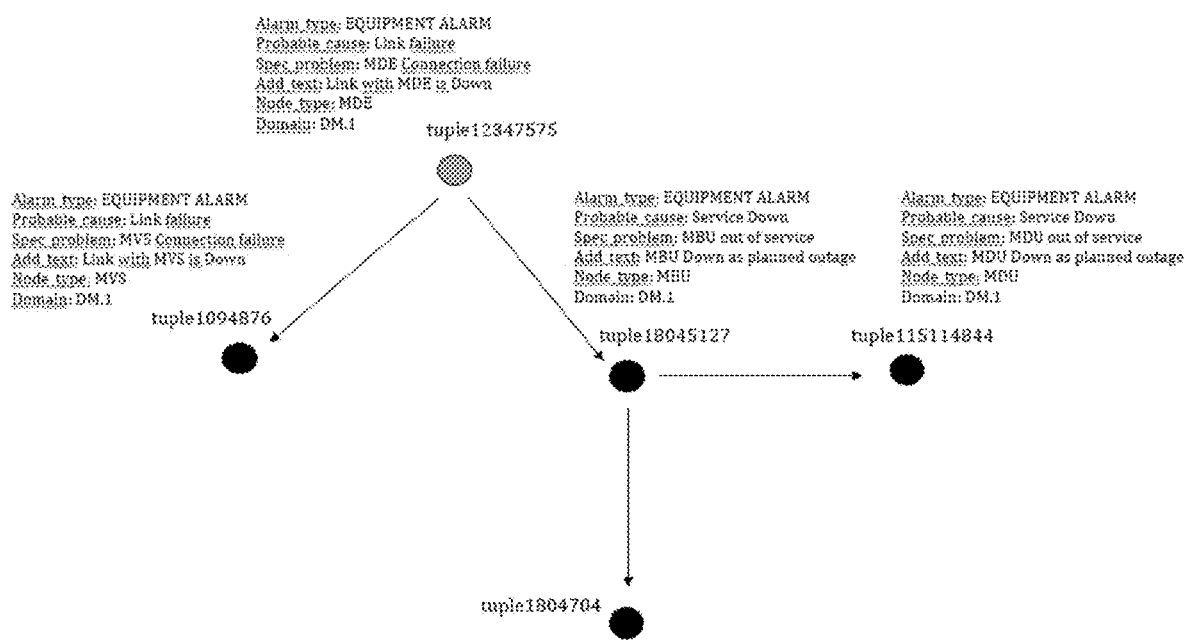
FIG. 4 is an example of a tuples family obtained by a method according to the invention.

FIG. 4 is an example of a tuples family, wherein five tuples are hierarchically organized according to the parent-child relations obtained in the previous steps.

Tuples connected hierarchically within a family share a relationship provided by the pipeline algorithm. The parent tuple in each of the families is called "root issue" and is presented at the end of the method as the most important events to deal with.

This significantly reduces the amount of crucial events, and provides the NOC with a set of events which is far easier to handle than the original dataset.

In some particular embodiments, the step of presenting the parent tuples comprises presenting the instances associated to each parent tuple.

Whether an instance is associated with an issue is analyzed in validation phase where we map how many families are associated with issues etc.

In some particular embodiments, the step of presenting the parent tuples comprises conferring a severity index to each parent tuple of each family, so that the final list of parent tuples is hierarchized.

The severity index is related, among others, with the number of tuples of the family. This severity classification can be done if a severity index is available in the original dataset of events.

The invention claimed is:

1. A method for managing a plurality of events, wherein each event comprises physical attributes and logical attributes, the method comprising the steps of:
   creating tuples, wherein each tuple corresponds to events having all the same logical attributes;
   providing a set of hierarchized relations between tuples, wherein combinations of two tuples form a pair of tuples, by means of an unsupervised machine learning pipeline algorithm, wherein parent-child relations are provided between tuples, by:
   creating a plurality of co-occurrence matrices, each co-occurrence matrix reflecting different time intervals, wherein each column corresponds with a tuple and each row corresponds with a time window, so each matrix entry represents the number of times that an event corresponding to each tuple appears in each time window;
   successively applying a heuristic function to each matrix entry of said plurality of co-occurrence matrices to obtain a co-occurrence probabilistic score for each pair of tuples, wherein the probabilistic score indicates the probability that one tuple of the pair, referred to as child tuple, co-occurs with the other tuple of the pair, referred to as parent tuple; and
   using the probabilistic score of each pair of tuples to quantify the strength of the parent-child relations;
   classifying the tuples in families, each family contains all the tuples related according to the parent-child relation provided by the unsupervised machine learning pipeline algorithm;

identifying the parent tuple of each family, defined as the tuple which has at least one child and has no parent; and presenting the parent tuple instances of each family, together with the physical attributes of the events associated to each parent tuple instance of each family.

2. The method according to claim 1, wherein the unsupervised machine learning algorithm further comprises:

dividing the events into two samples;

wherein the step of creating the plurality co-occurrence matrices, comprises apply the for each of the two samples wherein each column corresponds with a tuple and each row corresponds with a time window, so each matrix entry represents the number of times that an event of said each sample corresponding to each tuple appears in each time window;

repeat applying the heuristic function to obtain a co-occurrence probabilistic score for each pair of tuples, wherein the probabilistic score indicates the probability that one tuple of the pair, referred to as child tuple, co-occurs with the other tuple of the pair, referred to as parent tuple;

identifying common parent-child relations in the two samples; and use the identified common parent-child relations to provide a final set of parent-child relations between tuples.

3. The method according to claim 2, wherein, prior to the step of dividing the events into two samples, the method comprises the step of cleaning the tuples, by deleting those tuples which do not fulfill a plurality of minimum requirements.

4. The method according to claim 2, further comprises:

creating a graph of parent-child relations based on the results of the heuristic function calculating a probability for each parent-child relation and mark those parent-child relations which has a probability higher than a predetermined threshold as strong.

5. The method according to claim 3, further comprising the step of creating a first attempt of parent-child relations by:

creating a graph of parent-child relations based on the results of the heuristic function; and calculating a probability for each parent-child relation and mark those parent-child relations which has a probability higher than a predetermined threshold as strong.

6. The method according to claim 2, further comprising the step of choosing a co-occurrence matrix based on having better probabilistic scores for parent-child relations vis-à-vis other co-occurrence matrices and use the parent-child relations generated by the optimal co-occurrence matrix to provide the final set of parent-child relations between tuple.

7. The method according to claim 3, further comprising the step of choosing a co-occurrence matrix based on having better probabilistic scores for parent-child relations vis-à-vis other co-occurrence matrices and use the parent-child relations generated by the optimal co-occurrence matrix to provide the final set of parent-child relations between tuples.

8. The method according to claim 1, wherein the step of presenting the parent tuples comprises presenting instances associated to each parent tuple.

9. The method according to claim 1, wherein the step of presenting the parent tuples comprises presenting instances associated to each parent tuple.

10. The method according to claim 2, wherein the step of presenting the parent tuples comprises presenting instances associated to each parent tuple.

11. The method according to claim 3, wherein the step of presenting the parent tuples comprises presenting the instances associated to each parent tuple.

12. The method according to claim 1, wherein the step of presenting the parent tuples comprises conferring a severity index to each parent tuple of each family, so that the final list of parent tuples is hierarchized.

13. The method according to claim 1, wherein the step of presenting the parent tuple instances comprises conferring a severity index to each parent tuple instance of each family, so that the final list of parent tuple instances is hierarchized.

14. The method according to claim 2, wherein the step of presenting the parent tuples comprises conferring a severity index to each parent tuple of each family, so that the final list of parent tuples is hierarchized.

* * * * *